United States Patent
Sano et al.

(10) Patent No.: US 10,897,902 B2
(45) Date of Patent: Jan. 26, 2021

(54) PESTICIDAL SOLID COMPOSITION CONTAINING CYCLANILIPROLE OR ITS SALT

(71) Applicant: ISHIHARA SANGYO KAISHA, LTD., Osaka (JP)

(72) Inventors: Mitsuo Sano, Osaka (JP); Chiaki Takeda, Osaka (JP); Takashi Okada, Osaka (JP); Taku Hamamoto, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/471,602

(22) PCT Filed: Dec. 25, 2017

(86) PCT No.: PCT/JP2017/046435
§ 371 (c)(1),
(2) Date: Jun. 20, 2019

(87) PCT Pub. No.: WO2018/123971
PCT Pub. Date: Jul. 5, 2018

(65) Prior Publication Data
US 2019/0380344 A1    Dec. 19, 2019

(30) Foreign Application Priority Data

Dec. 27, 2016   (JP) ................................. 2016-253792

(51) Int. Cl.
| | | |
|---|---|---|
| *A01N 25/02* | (2006.01) | |
| *A01N 25/14* | (2006.01) | |
| *A01N 25/30* | (2006.01) | |
| *A01N 43/56* | (2006.01) | |
| *A01G 7/06* | (2006.01) | |

(52) U.S. Cl.
CPC .............. *A01N 43/56* (2013.01); *A01G 7/06* (2013.01); *A01N 25/02* (2013.01); *A01N 25/14* (2013.01); *A01N 25/30* (2013.01)

(58) Field of Classification Search
None
See application file for complete search history.

(56) References Cited

U.S. PATENT DOCUMENTS

| | | |
|---|---|---|
| 2007/0129407 A1 | 6/2007 | Koyanagi et al. |
| 2010/0317700 A1 | 12/2010 | Morita et al. |
| 2012/0015804 A1 | 1/2012 | Terada et al. |
| 2014/0005048 A1 | 1/2014 | Gutsche et al. |
| 2017/0265459 A1 | 9/2017 | Anton et al. |

FOREIGN PATENT DOCUMENTS

| | | | |
|---|---|---|---|
| CN | 106614606 | * | 5/2017 |
| CN | 106614606 A | * | 5/2017 |
| JP | 40-008920 | | 5/1965 |
| JP | 2003-286106 | | 10/2003 |
| JP | 2010-150227 | | 7/2010 |
| JP | 2011-057629 | | 3/2011 |
| JP | 2015-063467 | | 4/2015 |
| WO | 2005/077934 | | 8/2005 |
| WO | 2009/002856 | | 12/2008 |
| WO | 2010/087380 | | 8/2010 |
| WO | 2011/083709 | | 7/2011 |
| WO | 2015/187788 | | 12/2015 |
| WO | 2016/017547 | | 2/2016 |

OTHER PUBLICATIONS

International Search Report with English translation issued in International Patent Application No. PCT/JP2017/046435, dated Feb. 6, 2018.
International Preliminary Report on Patentability Chapter I with English translation issued in International Patent Application No. PCT/JP2017/046435, dated Jul. 2, 2019.
Written Opinion of the International Searching Authority issued in International Patent Application No. PCT/JP2017/046435, dated Feb. 6, 2018.

* cited by examiner

*Primary Examiner* — Alton N Pryor
(74) *Attorney, Agent, or Firm* — Greenblum & Bernstein, P.L.C.

(57) ABSTRACT

To provide a pesticidal solid composition which is excellent in the controlling effects with reduced labor in application operation with a smaller dose.
A pesticidal solid composition, which comprises a solution having cyclaniliprole or its salt and an anionic surfactant dissolved in a polar solvent (component (1)), an oil-absorbing powder (component (2)) and a granular carrier (component (3)) (the anionic surfactant is described in the specification); and the component (1) is absorbed into or attached to at least one of the components (2) and (3).

15 Claims, No Drawings

PESTICIDAL SOLID COMPOSITION CONTAINING CYCLANILIPROLE OR ITS SALT

TECHNICAL FIELD

The present invention relates to a pesticidal solid composition containing cyclaniliprole or its salt as an active ingredient and a method for protecting plants after germination or transplantation from pests, by applying the composition to seeds or seedlings.

BACKGROUND ART

Cydaniliprole is a common name and its chemical name is 3-bromo-N-[2-bromo-4-chloro-6-[[(1-cyclopropylethyl) amino]carbonyl]phenyl-1-(3-chloropyridin-2-yl)-1H-pyrazol-5-carboxamide. The compound is an anthranilamide compound useful as an insecticide and is disclosed as compound No. 16 in Patent Document 1. However, Patent Document 1 failed to specifically disclose a method for protecting plants from pests after germination or transplantation by applying the compound to seeds or seedlings.

Patent Document 2 discloses a solid arthropodicide composition comprising particles of a solid carrier obtained by infiltrating the solid carrier with a mixture comprising the carboxamide arthropodicides represented by a general formula including cyclaniliprole and a specific surfactant constituent dissolved in a solvent, followed by solvent evaporation. Further, it also discloses that the composition can be applied to seeds and other propagules as a coating formulation in the form of dusts or powders. However, this composition is different from the pesticidal solid composition of the present invention in that no specific anionic surfactant is used.

Patent Document 3 discloses a method for controlling pests, which comprises applying a granular agrochemical composition which contains a compound represented by a general formula including cyclaniliprole, one or more compounds that have plant disease control activity, such as thiadinil, an extender containing a smectite mineral, and a water-soluble binder, to a seedling tray. Further, Patent Document 4 discloses that as an agrochemical active ingredient of a propagule coating composition comprising a coating composition and a pesticide, a compound of a general formula including cyclaniliprole is applicable.

However, the compositions disclosed in Patent Documents 3 and 4 are different from the pesticidal solid composition of the present invention in that a solution having cydaniliprole and a specific anionic surfactant dissolved in a polar solvent is not contained in the composition.

Patent Document 5 discloses a solid agrochemical composition comprising a sulfonylurea compound and an anionic surfactant such as a salt of polyoxyethylene aryl phenyl ether sulfuric acid ester or a salt of polyoxyethylene alkyl ether sulfuric acid ester. However, a solution having an active ingredient compound and an anionic surfactant dissolved in a polar solvent is not employed.

PRIOR ART DOCUMENTS

Patent Documents

Patent Document 1: WO2005/077934
Patent Document 2: WO2009/002856
Patent Document 3: WO2011/083709
Patent Document 4: WO2015/187788
Patent Document 5: WO2016/017547

DISCLOSURE OF INVENTION

Technical Problem

Conventional pesticidal compositions respectively have characteristics in spectra and effects, however, their effects may be insufficient against specific pests, their residual activity will last only for a short period of time and effects for a certain period cannot be expected, and they sometimes have practically no sufficient controlling effects. Further, even though they are excellent in the controlling effects, labor saving in application operation and to achieve high controlling effects with a smaller dose may sometimes be required.

Solution to Problem

The present inventors have conducted extensive studies to achieve the above object and as a result, found that by applying in water a pesticidal solid composition which comprises a solution having cyclaniliprole or its salt and an anionic surfactant dissolved in a polar solvent (component (1)), an oil-absorbing powder (component (2)) and a granular carrier (component (3)); wherein the anionic surfactant is at least one member selected from the group consisting of a salt of polyoxyethylene aryl phenyl ether sulfuric acid ester, a salt of polyoxyethylene aryl phenyl ether phosphoric acid ester, a salt of polyoxyethylene alkyl phenyl ether sulfuric acid ester, a salt of polyoxyethylene alkyl phenyl ether phosphoric acid ester, a salt of polyoxyethylene alkyl ether sulfuric acid ester and a salt of polyoxyethylene alkyl ether phosphoric acid ester; and the component (1) is absorbed into or attached to at least one of the components (2) and (3), cyclaniliprole tends to be highly eluted and readily be diffused and stay in e.g. the soil via e.g. water, and accordingly an unexpectedly high controlling effect can be achieved simply and safely with a small dose, and accomplished the present invention.

That is, the present invention relates to a pesticidal solid composition, which comprises a solution having cyclaniliprole or its salt and an anionic surfactant dissolved in a polar solvent (component (1)), an oil-absorbing powder (component (2)) and a granular carrier (component (3)); wherein the anionic surfactant is at least one member selected from the group consisting of a salt of polyoxyethylene aryl phenyl ether sulfuric acid ester, a salt of polyoxyethylene aryl phenyl ether phosphoric acid ester, a salt of polyoxyethylene alkyl phenyl ether sulfuric acid ester, a salt of polyoxyethylene alkyl phenyl ether phosphoric acid ester, a salt of polyoxyethylene alkyl ether sulfuric acid ester and a salt of polyoxyethylene alkyl ether phosphoric acid ester; and the component (1) is absorbed into or attached to at least one of the components (2) and (3); a method for controlling pests, which comprises applying the composition to pests or to a place where they emerge; and a method for protecting plant seedlings, which comprises applying the composition to the seedlings.

Advantageous Effects of Invention

According to the present invention, improvement of the safety for environment in view of labor saving in application operation and prevention of flying of the chemicals can be expected as compared with a conventional chemical application method, and in addition, an unexpectedly high controlling effect can be achieved with a smaller dose.

DESCRIPTION OF EMBODIMENTS

The salt of cyclaniliprole may, for example, be an inorganic salt such sodium salt, potassium salt or calcium salt, an ammonium salt or a salt with an organic base such as dimethylamine salt. The salt of cyclaniliprole may be produced in accordance with the method disclosed in Patent Document 1.

The anionic surfactant used in the present invention is at least one member selected from the group consisting of a salt of polyoxyethylene aryl phenyl ether sulfuric acid ester, a salt of polyoxyethylene aryl phenyl ether phosphoric acid ester, a salt of polyoxyethylene alkyl phenyl ether sulfuric acid ester, a salt of polyoxyethylene alkyl phenyl ether phosphoric acid ester, a salt of polyoxyethylene alkyl ether sulfuric acid ester and a salt of polyoxyethylene alkyl ether phosphoric acid ester. Among them, preferred is at least one member selected from the group consisting of a salt of polyoxyethylene aryl phenyl ether sulfuric acid ester and a salt of polyoxyethylene alkyl ether sulfuric acid ester, and most preferred is a salt of polyoxyethylene aryl phenyl ether sulfuric acid ester. The number of carbon atoms in the alkyl moiety of the salt of polyoxyethylene alkyl ether sulfuric acid ester is preferably from 8 to 12. The salt of polyoxyethylene aryl phenyl ether sulfuric acid ester may, for example, be SORPOL T-10SPG (tradename, manufactured by TOHO Chemical Industry Co., Ltd.), SORPOL T-SPG (tradename, manufactured by TOHO Chemical Industry Co., Ltd.), SORPOL T-SPG (tradename, manufactured by TOHO Chemical Industry Co., Ltd.), SORPOL 7920PG (tradename, manufactured by TOHO Chemical Industry Co., Ltd.), New Kargen EP-72PG (tradename, manufactured by TAKEMOTO OIL & FAT Co., Ltd.), New Kargen EP-75PG (tradename, manufactured by TAKEMOTO OIL & FAT Co., Ltd.), New Kargen EP-77PG (tradename, manufactured by TAKEMOTO OIL & FAT Co., Ltd.) or Sopropher 4D/384 (tradename, manufactured by Solvay Nicca Ltd.).

Such anionic surfactants used in the present invention are obtained by anionizing nonionic surfactants to be formed into a sulfuric acid ester salt or a phosphoric acid ester salt, and the salt may be sodium salt, potassium salt, or ammonium salt.

The "polar solvent" used in the present invention may be any solvent so long as cyclaniliprole or its salt and the above anionic surfactant are soluble in it, and is preferably one in which at least 5,000 ppm, preferably at least 1,000 ppm of cydaniliprole is dissolved at 20° C. It is specifically preferably at least one member selected from the group consisting of N,N-dimethylformamide, N,N-dimethylacetamide, N,N-dimethyloctanamide, N,N-dimethyldecanamide, N-methyl-2-pyrrolidone, N-ethyl-2-pyrrolidone, N-octyl-2-pyrrolidone, dimethylsulfoxide, γ-butyrolactone, cyclohexanone, dibasic acid ester, propylene glycol, propylene glycol monomethyl ether, dipropylene glycol monomethyl ether, tetrahydrofurfuryl alcohol, benzyl alcohol, n-butanol, 2-ethylhexanol and cyclohexanol. Among them, more preferred is N-methyl-2-pyrrolidone. Further, in the component (1), the amount of cyclaniliprole or its salt is preferably at most 50 parts by weight, more preferably at most 40 parts by weight, further preferably at most 30 parts by weight based on 100 parts by weight of the polar solvent. Further, the amount of the anionic surfactant is preferably at most 60 parts by weight, more preferably at most 50 parts by weight, further preferably at most 40 parts by weight based on 100 parts by weight of the polar solvent.

In the present invention, the "oil-absorbing powder" as the component (2) means a powder having spaces or a surface in which or to which the component (1) is absorbed or attached, therein. The particle size of the oil-absorbing powder is usually smaller than the particle size of the granular carrier, and is preferably at most 150 μm, more preferably within a range of from 0.01 μm to 150 μm, further preferably within a range of from 0.1 μm to 150 μm, by the volume average particle size (the term "within a range of" is used to include the boundary values, and the same applies hereinafter). Further, the oil-absorbing powder as the component (2) is preferably one having oil-absorbing ability by which the component (1) is absorbed or attached, and is preferably one having a high $SiO_2$ content. Examples of a particularly preferred oil-absorbing powder include zeolite, montmorillonite, diatomaceous earth, pearlite, silica gel, bentonite, porous alumina, kaolinite, talc, white carbon, activated clay, attapulgite, vermiculite, Celite, hydrotalcite and hydrated $SiO_2$ precipitated in an impalpable powder form.

In the present invention, the "granular carrier" as the component (3) can have the oil-absorbing powder as the component (2) having the component (1) absorbed therein or attached thereto, attached to its surface. The granular carrier as the component (3) preferably contains particles having a particle size larger than that of the oil-absorbing powder as the component (2), and it is more preferably that most (for example, at least 80 wt %, preferably at least 90 wt %) of the granular carrier as the component (3) is composed of particles having a particle size larger than 200 μm. The granular carrier as the component (3) may, for example, be at least one member selected from the group consisting of seeds, a mineral granular carrier and a sugar. The mineral carrier may be at least one member selected from the group consisting of silica sand, silica stone, pumice and calcium carbonate. The sugar may be at least one member selected from the group consisting of glucose, sucrose, dextrin and starch. The mineral carrier and the sugar may properly be formed into granules. The weight ratio of the component (1) to the component (2) is preferably within a range of from 1:100 to 100:1, more preferably within a range of from 1:50 to 50:1. The weight ratio of the component (2) to the component (3) is preferably within a range of from 1:2,000 to 1:5, more preferably within a range of from 1:1,000 to 1:5. Further, the granular carrier itself as the component (3) may have spaces so that the oily component, for example, the component (1) is absorbed therein or attached thereto.

In the pesticidal solid composition of the present invention (hereinafter sometimes referred to as the composition of the present invention), the component (1) is absorbed into or attached to at least one of the oil-absorbing powder (component (2)) and the granular carrier (component (3)). For example, the component (1) is made to be absorbed into or attached to the spaces in or the surface of the component (2), and the surface of the component (3) is covered with the resulting component (2) to prepare the composition of the present invention. On that occasion, the component (1) may be made to be absorbed into or attached to the component (3) also. Otherwise, the component (1) may be made to be absorbed into or attached to the component (3), and the resulting component (3) is covered with the component (2) to prepare the composition of the present invention. On that occasion, the component (1) may be made to be absorbed into or attached to the component (2) also. Further, the component (1), the component (2) and the component (3) may be mixed to prepare the composition of the present invention. On that occasion, the component (1) may be made to be absorbed into or attached to both the component (2) and the component (3). When the composition of the present invention is prepared by such a method, the component (1) may be made to be absorbed into or attached to the resulting component prepared by combining the component (2) and the component (3) by a binder. In the composition of the present invention, it is preferred that after the component (1) is absorbed into or attached to the component (2) or the component (3), the polar solvent is not evaporated from the component (1) and the component (1) is present in a liquid state.

The binder may, for example, be a lower alkylene glycol such as ethylene glycol, propylene glycol, diethylene glycol, dipropylene glycol or hexylene glycol; a polyalkylene glycol such as polyethylene glycol or polypropylene glycol; a sugar such as sucrose, a sugar derivative such as mannitol; starch, a modified starch such as dextrin; an artificial polymer such as polyvinyl alcohol, hydrolyzed polyvinyl acetate, polyvinyl methyl ether or polyvinyl pyrrolidinone; or a polymer surfactant such as carboxymethyl cellulose salt or lignin sulfonate. Among such binders, preferred is an artificial polymer, more preferred is polyvinyl alcohol. The amount of the binder is preferably at most 20 parts by weight, more preferably at most 10 parts by weight based on 100 parts by weight of the granular carrier as the component (3).

The composition of the present invention is in a granular form when prepared and may be used as granules as it is. Further, when seeds are used as the granular carrier, the composition may be used as seeds as it is. Otherwise, as the case requires, it may be formulated with an agricultural adjuvant into various formulations such as a dust, granules and a wettable powder. When it is formulated into a powder or a wettable powder, the composition of the present invention may suitably be pulverized. In such formulations, the proportion of cyclaniliprole or its salt is usually from 0.01 to 98 parts by weight, preferably from 0.1 to 95 parts by weight based on the total weight (100 parts by weight) of the composition. Such formulations may be used as they are or may be diluted to a predetermined concentration with a diluting agent such as water.

The agricultural adjuvant may, for example, be a filler, an emulsifying agent, a dispersing agent, a spreader, a penetrating agent, a wetting agent, a thickener, an antifoaming agent, a stabilizer or an anti-freezing agent, and may properly be added as the case requires. The filler is classified into a solid filler and a liquid filler, the solid filler may, for example, be a plant/animal powder such as activated carbon, soybean meal, wheat flour, wood flour, fish flour or milk powder; sulfur powder; or anhydrous sodium sulfate; and the liquid filler may, for example, be water; a ketone such as acetone or methyl ethyl ketone; an ether such as dioxane or tetrahydrofuran; an aliphatic hydrocarbon such kerosine or coal oil; an aromatic hydrocarbon such as xylene, trimethylbenzene, tetramethylbenzene, cyclohexane or solvent naphtha; a halogenated hydrocarbon such as chloroform or chlorobenzene; an ester such as ethyl acetate or an glycerine ester of a fatty acid; a nitrile such as acetonitrile; or a vegetable oil such as soybean oil or corn oil.

The object to be treated by the composition of the present invention may, for example, be seeds or seedlings of agricultural and horticultural crop plants. As the application to seeds, seeds may be selected as the granular carrier. The seeds and seedlings herein include not only seeds used as the granular carrier but also seedlings, seed tubers, tubers, bulbs, corms, scaly bulbs, bulbils, plant pieces for grafting and juvenile seedlings. The agricultural and horticultural crop plants include, for example, cereal crops such as rice, barley, wheat, *Avena sativa*, rye, oat, corn and buckwheat; tubers and legumes such as potato, sweet potato, soybean, adzuki bean, kidney bean, English pea, fava bean and peanut; industrial crops such as mulberry, tobacco, tea, sugar beet, sugarcane, rush, cotton, flax, hemp, rapeseed, sesame, safflower, hop, ginseng, geranium and olive; vegetables such as tomato, eggplant, hot pepper, sweet pepper, cucumber, melon, watermelon, pumpkin, Japanese radish, Chinese cabbage, cabbage, cauliflower, onion, Welsh onion, *Allium chinense*, Chinese chive, garlic, asparagus, burdock, garland chrysanthemum, Petasites japonicus, artichoke, carrot, celery, parsley, Chinese celery, Japanese honeywort, spinach, taro, Chinese yam, arrowhead, lotus root, ginger, Japanese ginger, strawberry and okra; and flowers such as sunflower, carnation, florist's daisy and orchid.

As the method of applying the composition of the present invention, the following may, for example, be mentioned.
(1) The composition of the present invention is injected into, spread on or dropped on seedling in a seedling pot, a seedling tray, a cell seed tray or a paper pot.
(2) The composition of the present invention is injected into, spread on, dropped on or mixed with e.g. soil, nursery soil or soil to be put into planting holes.
(3) The composition of the present invention is injected into, spread on or dropped on e.g. furrows, planting holes or ridges.

The amount of cyclaniliprole or its salt in the composition of the present invention to be applied to seeds or seedlings cannot generally be defined since it varies depending upon e.g. the type of plants to be protected, the method of applying the composition and the type of pests to be controlled, and in the case of seed treatment, it is usually from 1 g to 5,000 g per 100 kg of seeds, preferably from 5 g to 1,000 g, more preferably from 60 g to 80 g.

Further, in the case of application to seedlings, the amount of cyclaniliprole or its salt in the composition of the present invention is usually from 0.01 mg to 500 mg per seedling, preferably from 0.1 mg to 100 mg. Or, it is usually from 1 to 5,000 g per hectare of the area to be treated, preferably from 5 g to 1,000 g. Further, in the case of application to e.g. planting holes, it is usually from 0.1 mg to 100 mg per seedling of a plant such as eggplant, cucumber, tomato, cabbage or melon, preferably from 5 mg to 20 mg.

The pests to be controlled by the present invention may, for example, be feeding insects or sucking insects which may damage plants during growth process of the plants, for example, Deltcephalidae such as green rice leafhopper (*Nephotettix cincticeps*) and Typhlocybinae; Delphacidae such as brown rice planthopper (*Nilaparvata luaens*), whitebacked planthopper (*Sogatella furcifera*) and small brown planthopper (*Laodelphax striatellus*); whiteflies such as sweetpotato whitefly (*Bemisia tabaci*) and greenhouse whitefly (*Trialeurodes vaporariorum*); aphids such as green peach aphid (*Myzus persicae*), cotton aphid (*Aphis gossypii*), turnip aphid (*Lipaphis psedobrassicas*), Glasshouse-potato aphid (*Aulacorthum solani*), greenbug (*Schizaphis graminum*) and Bird cherry-oat aphid (*Rhopalosiphum padi*); scale insects such as Cornstock mealybug (*Pseudococcus comstocki*), red wax scale (*Ceroolastes rubens*), San Jose scale (*Comstockaspis pemiciosa*) and arrowhead snow scale (*Unaspis vanonensis*); thrips such as *Frankliniella intonsa*, *Thrips tabaci*, yellow tea *thrips* (*Scirtothrips dorsalis*), melon thrips (*Thris palmi*), greenhouse *thrips* (*Heliothrips haemorrhoidalis*), western flower thrips (*Frankliniella occi-* dentalis) and *Haolothrios aculeatus*; beetles such as striped flea beetle (*Phyllotreta striolata*), colorado potato beetle (*Leptinotarsa decemlineata*), *Medythia niarobilineata, Anomala cuprea* and Japanese beetle (*Popillia japonica*); and butterflies such as *Plutellaxylostella*, cabbage armyworm (*Mamestra brassicae*), *Spodoptera litura*, codling moth (*Cydia pomonella*), tobacco budworm (*Heliothis virescens*), gypsy moth (*Lymantria dispar*), rice leafroller (*Cnaphalocrocis medinalis*), smaller tea tortrix (*Adoxophves* sp., black cutworm (*Aarotis ipsilon*), cutworm (*Aarotis segetum*) and cabbageworm.

In the present invention, in a case where a granular carrier other than seeds is used as the component (3), the composition may be applied to seeds or seedlings sown or transplanted in a seedling pot, a seedling tray, a cell seed tray or a paper pot. Further, in a case where seeds are used as the granular carrier, the composition may be sown as it is to a seedling pot, a seedling tray, a cell seed tray or a paper pot. Cyclaniliprole or its salt has excellent systemic properties, and by the application of the composition of the present invention to e.g. a seeding tray, cyclaniliprole or its salt absorbed through the roots of the plants can efficiently be brought into the plant body. Accordingly, it is possible to efficiently control pests such as insects which damage plants, by the composition of the present invention. The composition of the present invention is particularly preferably applied for controlling sucking insects damaging rice sown in a seedling tray. Further, when the composition of the present invention is used to treat rice in a seedling tray, cyclaniliprole or its salt is diffused and stays in e.g. soil via e.g. moisture, whereby its residual activity will last for a long period of time. According to the composition of the present invention, since cyclaniliprole or its salt will readily be eluted into water as described above, the controlling effect will effectively be obtained. Elution here means that cyclaniliprole or its salt by itself, cyclaniliprole or its salt and the anionic surfactant or cyclaniliprole or its salt, the anionic surfactant and the polar solvent together, are dissociated from the oil-absorbing powder, transferred to an aqueous layer and dissolved or dispersed, or transferred to seeds.

The composition of the present invention may be mixed with or used in combination with a pesticide other than cyclaniliprole or its salt. Such other pesticide may be mixed when the composition of the present invention is prepared or when it is applied to seeds or seedlings. Further, in a case where such other pesticide is mixed when the composition of the present invention is prepared, the pesticide may be added to any of the components (1) to (3). Such other pesticide may, for example, be an insecticide, a miticide, a nematicides or a soil insect pesticide, a fungicide, or a microbial agricultural chemical such as a BT agent or an insect virus.

The active ingredient compounds of the insecticide, the miticide, the nematicide or the soil insect pesticide as the above-mentioned other pesticide, include, for example (by common names, some of them are still in an application stage, or test codes of Japan Plant Protection Association):

organic phosphate compounds, such as profenofos, dichlorvos, fenamiphos, fenitrothion, EPN, diazinon, chlorpyrifos, chlorpyrifos-methyl, acephate, prothiofos, fosthiazate, cadusafos, disulfoton, isoxathion, isofenphos, ethion, etrimfos, quinalphos, dimethylvinphos, dimethoate, sulprofos, thiometon, vamidothion, pyraclofos, pyridaphenthion, pirimiphos-methyl, propaphos, phosalone, formothion, malathion, tetrachlorvinphos, chlorfenvinphos, cyanophos, trichlorfon, methidathion, phenthoate, ESP, azinphos-methyl, fenthion, heptenophos, methoxychlor, parathion, phosphocarb, demeton-S-methyl, monocrotophos, methamidophos, imicyafos, parathion-methyl, terbufos, phosphamidon, phosmet, phorate, phoxim and triazophos;

carbamate compounds, such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC and fenothiocarb;

nereistoxin derivatives, such as cartap, thiocyclam, bensultap, thiosultap-sodium thiosultap-disodium, monosultap, bisultap and thiocyclam hydrogen oxalate; organic chlorine compounds, such as dicofol, tetradifon, endosulfan, dienochlor and dieldrin;

organic metal compounds, such as fenbutatin oxide and cyhexatin;

pyrethroid compounds, such as fenvalerate, permethrin, cypermethrin, deltamethrin, cyhalothrin, tefluthrin, ethofenprox, flufenprox, cyfluthrin, fenpropathrin, flucythrinate, fluvalinate, cycloprothrin, lambda-cyhalothrin, pyrethrins, esfenvalerate, tetramethrin, resmethrin, protrifenbute, bifenthrin, zeta-cypermethrin, acrinathrin, alpha-cypermethrin, allethrin, gamma-cyhalothrin, theta-cypermethrin, tau-fluvalinate, tralomethrin, profluthrin, beta-cypermethrin, beta-cyfluthrin, metofluthrin, phenothrin, flumethrin and decamethrin;

benzoylurea compounds, such as diflubenzuron, chlorfluazuron, teflubenzuron, flufenoxuron, triflumuron, hexaflumuron, lufenuron, novaluron, noviflumuron, bistrifluron and fluazuron;

juvenile hormone-like compounds, such as methoprene, pyriproxyfen, fenoxycarb and diofenolan;

pyridazinone compounds, such as pridaben;

pyrazole compounds, such as fenpyroximate, fipronil, tebufenpyrad, ethiprole, tolfenpyrad, acetoprole, pyrafluprole and pyriprole;

neonicotinoids, such as imidacloprid, nitenpyram, acetamiprid, thiacloprid, thiamethoxam, clothianidin, nidinotefuran, dinotefuran and nithiazine;

hydrazine compounds, such as tebufenozide, methoxyfenozide, chromafenozide and halofenozide;

pyridine compounds, such as pyridalyl and flonicamid;

cyclic keto-enol compounds, such as spirodidofen; spiromesifen and spirotetramat;

strobilurin compounds, such as fluacrypyrim;

pyrimidinamine compounds, such as flufenerim;

dinitro compounds; organic sulfur compounds; urea compounds; triazine compounds; hydrazone compounds;

other compounds, such as flometoquin, buprofezin, hexythiazox, amitraz, chlordimeform, silafluofen, triazamate, pymetrozine, pyrimidifen, chlorfenapyr, indoxacarb, acequinocyl, etoxazole, cyromazine, 1,3-dichloropropene, diafenthiuron, benclothiaz, bifenazate, propargite, clofentezine, metaflumizone, flubendiamide, cyflumetofen, chlorantraniliprole, cyantraniliprole, cyclaniliprole, cyenopyrafen, pyrifluquinazon, fenazaquin, amidoflumet, sulfluramid, hydramethylnon, metaldehyde, ryanodine, verbutin, chlorobenzoate, thiazolylcinnanonitrile, sulfoxaflor, fluensulfone, triflumezopyrim, afidopyropen, flupyradifuron, NC-515, tetraniliprole, fluralaner, broflanilide, didoromezotiaz, fluhexafon, tioxazafen, DKN-2601, MSI-1302, NA-89, MIE-1209, ZDI-2502, NNI-1501, S-1578, BAI-1602, BAI-1603 and DAI-1601. Further, the composition of the present invention may be mixed with or used in combination with microbial agricultural chemicals, such as insecticidal crystal proteins produced by Bacillus thuringiensis such as Bacillus thuringiensis aizawai, Bacillus thuringiensis kurstaki, Bacillus thuringiensis israelensis, Bacillus thuringiensis japonensis or Bacillus thuringiensis tenebrionis, insect viruses, entomopathogenic fungi, and nematophagous fungi; antibiotics or semisynthetic antibiotics, such as avermectin, emamectin benzoate, milbemectin, milbemycin, spinosad, ivermectin, lepimectin, DE-175, abamectin, emamectin and spinetoram; natural products, such as azadirachtin and rotenone; and repellents, such as deet.

The active ingredient compounds of the fungicide as the above-mentioned other agricultural chemical include, for example (by common names, some of them are still in an application stage, or test codes of Japan Plant Protection Association):

anilinopyrimidine compounds, such as mepanipyrim, pyrimethanil, cyprodinil and ferimzone;

triazoropyrimidine compounds, such as 5-chloro-7-(4-methylpiperidin-1-yl)-6-(2,4,6-trifluorophenyl)[1,2,4]triazolo[1,5-a]pyrimidine;

pyridinamine compounds, such as fluazinam;

azole compounds, such as triadimefon, bitertanol, triflumizole, etaconazole, propiconazole, penconazole, flusilazole, myclobutanil, cyproconazole, tebuconazole, hexaconazole, furconazole-cis, prochloraz, metconazole, epoxiconazole, tetraconazole, oxpoconazole fumarate, sipconazole, prothioconazole, triadimenol, flutriafol, difenoconazole, fluquinconazole, fenbuconazole, bromuconazole, diniconazole, tricyclazole, probenazole, simeconazole, pefurazoate, ipconazole and imibenconazole; quinoxaline compounds, such as quinomethionate;

dithiocarbamate compounds, such as maneb, zineb, mancozeb, polycarbamate, metiram, propineb and thiram;

organic chlorine compounds, such as fthalide, chlorothalonil and quintozene; imidazole compounds, such as benomyl, cyazofamid, thiophanate-methyl, carbendazim, thiabendazole and fuberiazole;

cyanoacetamide compounds, such as cymoxanil;

anilide compounds, such as metalaxyl, metalaxyl-M, mefenoxam, oxadixyl, ofurace, benalaxyl, benalaxyl-M (another name: kiralaxyl, chiralaxyl), furalaxyl, cyprofuram, carboxin, oxycarboxin, thifluzamide, boscalid, bixafen, isotianil, tiadinil and sedaxane;

sulfamide compounds, such as dichlofluanid;

copper compounds, such as cupric hydroxide and oxine copper;

isoxazole compounds, such as hymexazol;

organophosphorus compounds, such as fosetyl-Al, toldofos-methyl, S-benzyl O,O-diisopropylphosphorothioate, O-ethyl S,S-diphenylphosphorodithioate, aluminum ethylhydrogen phosphonate, edifenphos, and iprobenfos;

phthalimide compounds, such as captan, captafol and folpet;

dicarboximide compounds, such as procymidone, iprodione and vinclozolin;

benzanilide compounds, such as flutolanil and mepronil;

amide compounds, such as penthiopyrad, mixture of 3-(difluoromethyl)-1-methyl-N-[(1RS,4SR,9RS)-1,2,3,4-tetrahydro-9-isopropyl-1,4-methanonaphthalen-5-yl]pyrazole-4-carboxamide and 3-(difluoromethyl)-1-methyl-N-[(1RS,4SR,9SR)-1,2,3,4-tetrahydro-9-isopropyl-1,4-methanonaphthalen-5-yl]pyrazole-4-carboxamide (isopyrazam), silthiopham, fenoxanil and furametpyr;

benzamide compounds, such as fluopyram and zoxamide;

piperazine compounds, such as triforine;

pyridine compounds, such as pyrifenox;

carbinol compounds, such as fenarimol;

piperidine compounds, such as fenpropidin;

morpholine compounds, such as fenpropimorph and tridemorph;

organotin compounds, such as fentin hydroxide and fentin acetate;

urea compounds, such as pencycuron;

cinnamic acid compounds, such as dimethomorph and flumorph;

phenylcarbamate compounds, such as diethofencarb;

cyanopyrrole compounds, such as fludioxonil and fenpiclonil;

strobilurin compounds, such as azoxystrobin, kresoxim-methyl, metominostrobin, trifloxystrobin, picoxystrobin, oryzastrobin, dimoxystrobin, pyraclostrobin, and fluoxastrobin;

oxazolidinone compounds, such as famoxadone; thiazolecarboxamide compounds, such as ethaboxam;

valinamide compounds, such as iprovalicarb and benthiavalicarb-isopropyl; acylamino acid compounds, such as methyl N-(isopropoxycarbonyl)-L-valyl-(3RS)-3-(4-chlorophenyl)-β-alaninate (valiphenalate);

imidazolinone compounds, such as fenamidone;

hydroxyanilide compounds, such as fenhexamid; benzenesulfonamide compounds, such as flusulfamide;

oxime ether compounds, such as cyflufenamid;

anthraquinone compounds;

crotonic compounds;

antibiotics, such as validamycin, kasugamycin and polyoxins;

guanidine compounds, such as iminoctadine and dodine;

quinoline compounds, such as 6-tert-butyl-8-fluoro-2,3-dimethylquinolin-4-yl acetate (tebufloquin);

thiazolidine compounds, such as (Z)-2-(2-fluoro-5-(trifluromethyl)phenylthio)-2-(3-(2-methoxyphenyl)thiazolidin-2-yliden)acetonitrile (flutianil);

and other compounds, such as pyribencarb, isoprothiolane, pyroquilon, diclomezine, quinoxyfen, propamocarb hydrochloride, chloropicrin, dazomet, metam-sodium, nicobifen, metrafenone, UBF-307, diclocymet, proquinazid, amisulbrom (another name: amibromdole), 3-(2,3,4-trimethoxy-6-methylbenzoyl)-5-chloro-2-methoxy-4-methylpyridine, 4-(2,3,4-trimethoxy-6-methylbenzoyl)-2,5-dichloro-3-trifluoromethylpyridine, pyriofenone, isofetamid, mandipropamid, fluopicolide, carpropamid, meptyldinocap, spiroxamine, fenpyrazamine, mandestrobin, ZF-9646, BCF-051, BCM-061 and BCM-062.

In order to increase adhesion of the active ingredient (cyclaniliprole or its salt, and the above-mentioned other pesticide) to seeds or seedlings, to the above formulations or chemical solutions diluted to a predetermined concentration with a diluting agent such as water, a natural or synthetic polymer such as agar, pectin, carrageenan, alginate or its derivative, xanthan gum, a cellulose derivative, polyvinyl alcohol, polyacrylamide, polyvinylpyrrolidone or a polycarboxylate, or a gelling agent may be added.

The mixing ratio (weight ratio) of cyclaniliprole or its salt to other pesticide cannot generally be defined, since it varies depending upon e.g. the type of the pesticide used in combination, the method of application of the agricultural chemicals, and is usually within a range of from 1:100 to 100:1, preferably within a range of from 1:50 to 50:1.

Now, some preferred embodiments of the present inventions are mentioned below, however, the present invention is not limited thereto.

(1) A pesticidal solid composition, which comprises a solution having cyclaniliprole or its salt and an anionic surfactant dissolved in a polar solvent (component (1)), an oil-absorbing powder (component (2)) and a granular carrier (component (3)); wherein the anionic surfactant is at least one member selected from the group consisting of a salt of polyoxyethylene aryl phenyl ether sulfuric acid ester, a salt of polyoxyethylene aryl phenyl ether phosphoric acid ester, a salt of polyoxyethylene alkyl phenyl ether sulfuric acid ester, a salt of polyoxyethylene alkyl phenyl ether phosphoric acid ester, a salt of polyoxyethylene alkyl ether sulfuric acid ester and a salt of polyoxyethylene alkyl ether phosphoric acid ester; and the component (1) is absorbed into or attached to at least one of the components (2) and (3).

(2) The composition according to (1), wherein the anionic surfactant is at least one member selected from the group consisting of a salt of polyoxyethylene aryl phenyl ether sulfuric acid ester and a salt of polyoxyethylene alkyl ether sulfuric acid ester.

(3) The composition according to (2), wherein the anionic surfactant is a salt of polyoxyethylene aryl phenyl ether sulfuric acid ester.

(4) The composition according to any one of (1) to (3), wherein the polar solvent is at least one member selected from the group consisting of N,N-dimethylformamide, N,N-dimethylacetamide, N,N-dimethyloctanamide, N,N-dimethyldecanamide, N-methyl-2-pyrrolidone, N-ethyl-2-pyrrolidone, N-octyl-2-pyrrolidone, dimethyl sulfoxide, γ-butyrolactone, cydohexanone, dibasic acid ester, propylene glycol, propylene glycol monomethyl ether, dipropylene glycol monomethyl ether, tetrahydrofurfuryl alcohol, benzyl alcohol, n-butanol, 2-ethylhexanol and cyclohexanol.

(5) The composition according to any one of (1) to (4), wherein the polar solvent is N-methyl-2-pyrrolidone.

(6) The composition according to any one of (1) to (5), wherein the components (2) and (3) are combined by a binder.

(7) The composition according to (6), wherein the binder is an artificial polymer.

(8) The composition according to (6), wherein the binder is polyvinyl alcohol.

(9) The composition according to any one of (1) to (8), wherein the component (1) absorbed into or attached to the component (2) or (3) is present in a liquid state.

(10) The composition according to any one of (1) to (9), wherein the component (3) is at least one member selected from the group consisting of seeds, a mineral granular carrier and a sugar.

(11) The composition according to any one of (1) to (10), wherein the component (3) is seeds.

(12) The composition according to any one of (1) to (11), wherein the dosage form is a seed treatment agent.

(13) The composition according to (10), wherein the component (3) is a mineral granular carrier.

(14) The composition according to any one of (10) or (13), wherein the mineral granular carrier is at least one member selected from the group consisting of silica sand, silica stone, pumice and calcium carbonate.

(15) The composition according to any one of (1) to (14), wherein the dosage form is a treatment agent to be applied to seedlings or soil in a seedling pot, a seedling tray, a cell seed tray or a paper pot.

(16) The composition according to any one of (1) to (15), wherein the dosage form is granules, a dust or a wettable power.

(17) The composition according to any one of (1) to (16), wherein the component (2) is at least one member selected from the group consisting of zeolite, montmorillonite, diatomaceous earth, pearlite, silica gel, bentonite, porous alumina, kaolinite, talc, white carbon, activated clay, attapulgite, vermiculite, Celite, hydrotalcite and hydrated $SiO_2$ precipitated in an impalpable powder form.

(18) The composition according to any one of (1) to (17), wherein the weight ratio of the component (1) to the component (2) is within a range of from 1:100 to 100:1.

(19) The composition according to any one of (1) to (18), wherein the weight ratio of the component (2) to the component (3) is within a range of from 1:2,000 to 1:5.

(20) A method for controlling pests, which comprises applying the composition as defined in any one of (1) to (19) to pests or to a place where they emerge.

(21) A method for protecting plant seedlings, which comprises applying the composition as defined in any one of (1) to (19) seeds, soil where the seeds grow, seedlings or soil where the seedlings grow.

(22) The method according to (20) or (21), wherein the composition is applied to seedlings or soil in a seedling pot, a seeding tray, a cell seed tray or a paper pot.

(23) A method for controlling pests, which comprises applying the composition as defined in any one of (1) to (19) to soil to which seeds are sown or seedlings are planted.

Formulation Example 1

0.75 part by weight of cyclaniliprole and 0.50 part by weight of SORPOL 7920P (manufactured by TOHO Chemical Industry Co., Ltd.) were dissolved in 1.50 parts by weight of N-methyl-2-pyrrolidone, and the obtained solution was added dropwise and mixed with 95.65 parts by weight silica sand No. 5 to be attached to the surface of the silica sand. 1.60 parts by weight of white carbon was further added and mixed to obtain the composition of the present invention.

Formulation Example 2

6.74 parts by weight of a 6.15% aqueous polyvinyl alcohol solution was added to 94.71 parts by weight of silica sand No. 5 and mixed, and 5.19 parts by weight of white carbon was further added and mixed, followed by drying to cover the silica sand No. 5 with the white carbon to prepare covered silica sand.

0.75 part by weight of cyclaniliprole and 1.30 parts by weight of SORPOL T-10SPG (manufactured by TOHO Chemical Industry Co., Ltd.) were dissolved in 1.50 parts by weight of N-methyl-2-pyrrolidone, and the obtained solution was mixed with 95.65 parts by weight of the covered silica sand so that the oil component was absorbed into the covered silica sand to obtain the composition of the present invention.

Formulation Example 3

1.5 g of cyclaniliprole and 2.6 g of SORPOL T-10SPG (manufactured by TOHO Chemical Industry Co., Ltd.) were dissolved in 3.0 g of N-methyl-2-pyrrolidone, and 10 g of white carbon was added to the obtained solution and mixed to prepare a uniformly dispersed mixed powder.

99.3 parts by weight of soybean seeds were wetted with water, and 0.7 part by weight of the mixed powder was added and mixed to powder the soybean seeds thereby to obtain the composition of the present invention.

Formulation Example 4

The composition of the present invention was prepared in the same manner as in Formulation Example 3 except that corn seeds were used instead of the soybean seeds.

Test Example 1 (Test on Controlling Effects Against *Cnaphalocrocis medinalis* Larvae)

A plastic case (9.5 cm×16 cm, 60 cells) partitioned into 1.2 cm square cells in a lattice form was filled with soil, and three rice seeds were sown in each cell. When the rice reached 1.5-leaf stage, the composition prepared in Formulation Example 1 was applied by hands uniformly to the entire surface of the soil in the plastic case in an amount of 4.2 g per case. The day after the application, the rice seedlings together with the soil in the cells were transplanted into a 1/5,000 are pot into which 3 L (liter) of soil was put, irrigated and subjected to puddling and leveling. The pot was left at rest in a glass greenhouse set at 20° C. On the 14th or 28th day after transplantation, the pot was covered with a cylinder, and 10 early second instar larvae of *Cnaphalocrocis medinalis* per pot were inoculated. After inoculation, the upper part of the cylinder was covered with gauze. On the 14th day after inoculation, the number of surviving larvae and the number of curling leaves were examined, and the mortality and the curling leaves-preventing value were calculated in accordance with the following formulae. The test was conducted three times, and the averages of the mortality and the curling leaves-preventing value are shown in Table 1.

Mortality (%)=[(number of larvae inoculated)−(number of surviving larvae)/(number of larvae inoculated)]×100

Curling leaves-preventing value (%)=100−[(number of curling leaves)−(number of leaves at the time of examination)]×100

TABLE 1

|  | On the 14th day after transplantation | | On the 28th day after transplantation | |
| --- | --- | --- | --- | --- |
|  | Mortality | Curling leaves-preventing value | Mortality | Curling leaves-preventing value |
| Formulation Example 1 | 100% | 100% | 100% | 100% |
| Non-treated group | 0% | 58% | 0% | 35% |

Test Example 2 (Test on Controlling Effect Against *Spodoptera litura* Larvae)

Into pots (90 mm in diameter, 90 mm in height) filled with soil, one seed of the composition prepared in Formulation Example 3 is sown per pot, and sprinkled with water. When the soybean grows, the pots were covered with a cylinder and *Sodoptera litura* larvae are inoculated. The upper part of the cylinder is covered with gauze. On the 5th or 6th day after inoculation, the number of surviving larvae is examined. The mortality calculated in accordance with the following formula is at least 90%.

Mortality (%)=[(number of larvae inoculated)−(number of surviving larvae)/(number of larvae inoculated)]×100

Test Example 3 (Test on Controlling Effect Against *Spodoptera litura* Larvae)

Into pots (60 mm in diameter, 55 mm in height) filled with soil, one seed of the composition prepared in Formulation Example 4 was sown per pot, and sprinkled with water. On the 7th and 14th days after sowing, the grown corn seedlings were cut at the boundary with the ground, and two of the seedlings were put in a plastic dish (90 mm in diameter, 15 mm in height) in which filter paper wetted with 1 mL of tap water was put. 10 late second instar larvae of *Spodoptera litura* were inoculated, and the dish was covered with a lid and left at rest in a constant temperature chamber set at 25° C. On the 5th day after inoculation, the number of surviving larvae (excluding apparently poorly grown larvae as compared with those in non-treated group) was examined, and the mortality and corrected mortality were calculated in accordance with the following formulae, and the results are shown in Table 2. The test was conducted five times, and the averages of the mortality and the corrected mortality are shown in Table 2.

Mortality (%)=[(number of larvae inoculated)−(number of surviving larvae)/(number of larvae inoculated)]×100

Corrected mortality (%)=[(mortality by the composition in Formulation Example 4)−(mortality in non-treated group)]/[100−(mortality in non-treated group)]×100

TABLE 2

|  | On the 7th day after sowing | | On the 14th day after sowing | |
| --- | --- | --- | --- | --- |
|  | Mortality on the 5th day after inoculation | Corrected mortality | Mortality on the 5th day after inoculation | Corrected mortality |
| Formulation Example 4 | 100% | 100% | 86% | 85% |
| Non-treated group | 40% | 0% | 8% | 0% |

Test Example 4 (Elution Test)

Into a 100 mL Erlenmeyer flask with lid, 50 mL of deionized water at 20° C. and 0.5 g of the composition prepared in Formulation Example 2 were put, and the flask was covered with the lid and left at rest at 20° C. for 3 hours. About 2 mL of water was sampled from the Erlenmeyer flask and subjected to filtration through a 0.45 μm filter to prepare a high performance liquid chromatography (HPLC) analysis sample. With respect to the sample, the amount of elution of cyclaniliprole was analyzed by HPLC, whereupon the concentration of cyclaniliprole in the water was 25 ppm.

Test Example 5 (Analysis of Concentration in Rice Body)

A plastic case (9.5 cm×16 cm, 60 cells) partitioned into 1.2 cm square cells in a lattice form was filled with soil, and three rice seeds were planted in each cell. When the rice reached 1.5-leaf stage, the composition prepared in Formulation Example 1 was applied by hands uniformly to the entire surface of the soil in the plastic case in an amount of 4.2 g per case. Three hours after the application, the rice seedlings together with the soil in the cells were transplanted into a 1/5,000 are pot into which 3 L (liter) of soil was put, irrigated and subjected to puddling and leveling. The pot was left at rest in a glass greenhouse at 20° C. On the 20th day after transplantation, the rice seedlings above the water surface was cut and subjected to the rice body concentration analysis. To the cut rice body, acetonitrile was added, extraction was conducted while pulverized by a homogenizer, followed by purification by a minicolumn, to prepare an analysis sample. Analysis was conducted by liquid chromatography mass spectrometry (LC-MS), and the concentration of cyclaniliprole in the rice body was 0.57 ppm.

INDUSTRIAL APPLICABILITY

According to the present invention, it is possible to provide a pesticidal solid composition which is excellent in the controlling effects with reduced labor in application operation with a smaller dose.

The entire disclosure of Japanese Patent Application No. 2016-253792 filed on Dec. 27, 2016 including specification, claims and summary is incorporated herein by reference in its entirety.

The invention claimed is:

1. A pesticidal solid composition, which comprises a solution having cyclaniliprole or its salt and an anionic surfactant dissolved in a polar solvent (component (1)), an oil-absorbing powder (component (2)) and a granular carrier (component (3)); wherein the anionic surfactant is at least one member selected from the group consisting of a salt of polyoxyethylene aryl phenyl ether sulfuric acid ester, and a salt of polyoxyethylene alkyl ether sulfuric acid ester; and the component (1) is absorbed into or attached to at least one of the components (2) and (3).

2. The composition according to claim 1, wherein the polar solvent is at least one member selected from the group consisting of N,N-dimethylformamide, N,N-dimethylacetamide, N,N-dimethyloctanamide, N,N-dimethyldecanamide, N-methyl-2-pyrrolidone, N-ethyl-2-pyrrolidone, N-octyl-2-pyrrolidone, dimethyl sulfoxide, γ-butyrolactone, cyclohexanone, dibasic acid ester, propylene glycol, propylene glycol monomethyl ether, dipropylene glycol monomethyl ether, tetrahydrofurfuryl alcohol, benzyl alcohol, n-butanol, 2-ethylhexanol and cyclohexanol.

3. The composition according to claim 1, wherein the components (2) and (3) are combined by a binder.

4. The composition according to claim 1, wherein the component (1) absorbed into or attached to the component (2) or (3) is present in a liquid state.

5. The composition according to claim 1, wherein the component (3) is at least one member selected from the group consisting of seeds, a mineral granular carrier and a sugar.

6. The composition according to claim 1, wherein the component (3) is seeds.

7. The composition according to claim 6, wherein dosage form of the composition is a seed treatment agent.

8. The composition according to claim 1, wherein the component (3) is a mineral granular carrier.

9. The composition according to claim 8, wherein the mineral granular carrier is at least one member selected from the group consisting of silica sand, silica stone, pumice and calcium carbonate.

10. The composition according to claim 8, wherein dosage form of the composition is a treatment agent to be applied to seedlings or soil in a seedling pot, a seedling tray, a cell seed tray or a paper pot.

11. The composition according to claim 1, wherein dosage form of the composition is granules, a dust or a wettable power.

12. A method for controlling pests, which comprises applying the composition as defined in claim 1 to pests or to a place where they emerge.

13. A method for protecting plant seedlings, which comprises applying the composition as defined in claim 10 to the seedlings.

14. The method according to claim 13, wherein the composition is applied to the seedlings or soil in the seedling pot, the seeding tray, the cell seed tray or the paper pot.

15. A method for controlling pests, which comprises applying the composition as defined in claim 1 to soil to which seeds are sown or seedlings are planted.

* * * * *

UNITED STATES PATENT AND TRADEMARK OFFICE
CERTIFICATE OF CORRECTION

PATENT NO. : 10,897,902 B2
APPLICATION NO. : 16/471602
DATED : January 26, 2021
INVENTOR(S) : Sano et al.

Page 1 of 1

It is certified that error appears in the above-identified patent and that said Letters Patent is hereby corrected as shown below:

In the Claims

Column 16, Lines 10-11 (Claim 7), "7. The composition according to claim 6, wherein dosage form of the composition is a seed treatment agent" should be -- 7. The composition according to claim 6, wherein the composition is formulated for seed treatment. --.
Column 16, Line 18-21 (Claim 10), "10. The composition according to claim 8, wherein dosage form of the composition is a treatment agent to be applied to seedlings or soil in a seedling pot, a seedling tray, a cell seed tray or a paper pot." should be -- 10. The composition according to claim 8, wherein the composition is formulated to be applied to seedlings or soil in a seedling pot, a seedling tray, a cell seed tray or a paper pot. --.
Column 16, Lines 22-24 (Claim 11), "11. The composition according to claim 1, wherein dosage form of the composition is granules, a dust or a wettable power." should be -- 11. The composition according to claim 1, wherein the composition is formulated as granules, a dust or a wettable powder. --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*